(12) United States Patent
Shimokoriyama

(10) Patent No.: US 7,057,995 B1
(45) Date of Patent: Jun. 6, 2006

(54) DIGITAL DATA REPRODUCING APPARATUS

(75) Inventor: Makoto Shimokoriyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/541,095

(22) Filed: Oct. 11, 1995

(30) Foreign Application Priority Data

Oct. 14, 1994 (JP) .................................. 6-249391

(51) Int. Cl.
*G11B 5/09* (2006.01)

(52) U.S. Cl. ....................................... 369/59.1; 360/51

(58) Field of Classification Search ................ 386/100, 386/38, 104, 14.67; 371/40.1; 375/376; 360/51, 72.2, 32, 64, 70, 77.14, 73.06, 78.02, 360/77.15, 48
See application file for complete search history.

(56) References Cited

U.S. PATENT DOCUMENTS

| | | | |
|---|---|---|---|
| 4,668,900 A | 5/1987 | Tabuchi ..................... 318/608 |
| 5,008,763 A * | 4/1991 | Horino ........................ 360/70 |
| 5,235,475 A * | 8/1993 | Tokumatsu et al. ........ 360/72.2 |
| 5,583,648 A | 12/1996 | Ichinoi et al. ................ 386/37 |
| 5,600,661 A * | 2/1997 | Shimokoriyama ......... 371/40.1 |
| 5,617,263 A * | 4/1997 | Mizushima et al. .......... 360/48 |
| 5,623,380 A * | 4/1997 | Noguchi et al. ......... 360/77.15 |
| 5,646,795 A | 7/1997 | Suzuki ........................ 360/18 |
| 5,796,536 A | 8/1998 | Sato et al. ................... 360/61 |

FOREIGN PATENT DOCUMENTS

JP          3-187055          8/1991

* cited by examiner

*Primary Examiner*—Muhammad Edun
(74) *Attorney, Agent, or Firm*—Fitzpatrick, Cella, Harper & Scinto

(57) ABSTRACT

An apparatus has a plurality of rotary heads for reproducing digital data from a recording medium, and delays a reference signal phase-locked with the rotary heads on the basis of the detection output of predetermined reference data in the reproduced digital data, thereby generating a signal indicating the reproducing start timing of the digital data by the plurality of rotary heads.

2 Claims, 4 Drawing Sheets

DIGITAL DATA REPRODUCING APPARATUS

BACKGROUND OF THE INVENTION

1. Field of the Invention

The present invention relates to a digital data reproducing apparatus and, more particularly, to an apparatus for reproducing digital data from a recording medium using a rotary head.

2. Related Background Art

As a conventional apparatus of this type, a VTR for recording/reproducing an image signal and an audio signal on/from a magnetic tape using a rotary head is known.

In such a VTR, the recording/reproducing start position of the head is controlled with high precision using a head switch pulse (to be referred to as an SWP hereinafter) which indicates the positional relationship of the head with respect to the tape.

The SWP is normally generated using a PG signal indicating the rotation phase of a cylinder. In this case, the phase relationship between the head and the PG signal is determined by the mounting precision of a motor of the cylinder which mounts the head, and the cylinder, and varies in units of apparatuses. For this reason, since the phase difference between the PG signal and the SWP varies in units of apparatuses, an appropriate SWP is obtained by adjusting the phase difference between the PG signal and the SWP in units of apparatuses.

However, in the above-mentioned conventional apparatus, the phase adjustment of the SWP must be performed in each apparatus, resulting in a very cumbersome operations.

The phase adjustment of the SWP is normally performed by a specialist upon delivery from a factory. Thus, it is impossible to perform the phase adjustment when the phase of the SWP deviates from that upon delivery due to the poor mounting precision of the motor and the cylinder, deterioration of the motor performance, and the like after delivery of the apparatus to a user.

Furthermore, in a domestic-use VTR, the recording start positions of data in tracks on tapes do not always precisely match among cassettes, and the phase of the SWP may be proper in a given cassette but may be improper in another cassette.

SUMMARY OF THE INVENTION

It is an object of the present invention to solve the above-mentioned problems.

It is another object of the present invention to precisely generate a recording/reproducing start reference signal of a head upon recording/reproducing of a signal.

In order to achieve the above objects, according to one aspect of the present invention, there is provided a digital data reproducing apparatus comprising (a) reproducing means for reproducing digital data from a recording medium using rotary head means, (b) detection means for detecting predetermined reference data in the reproduced digital data, and (c) generation means for generating a reference signal indicating a reproducing start timing of the digital data by the rotary head means in correspondence with an output from the detection means.

It is still another object of the present invention to precisely reproduce digital data even from recording media having different data recording start positions.

The above and other objects and features of the present invention will become apparent from the following detailed description of the preferred embodiments taken in conjunction with the accompanying drawings.

DETAILED DESCRIPTION OF THE PREFERRED EMBODIMENTS

The preferred embodiment of the present invention will be described in detail hereinafter with reference to the accompanying drawings.

Figure 1:
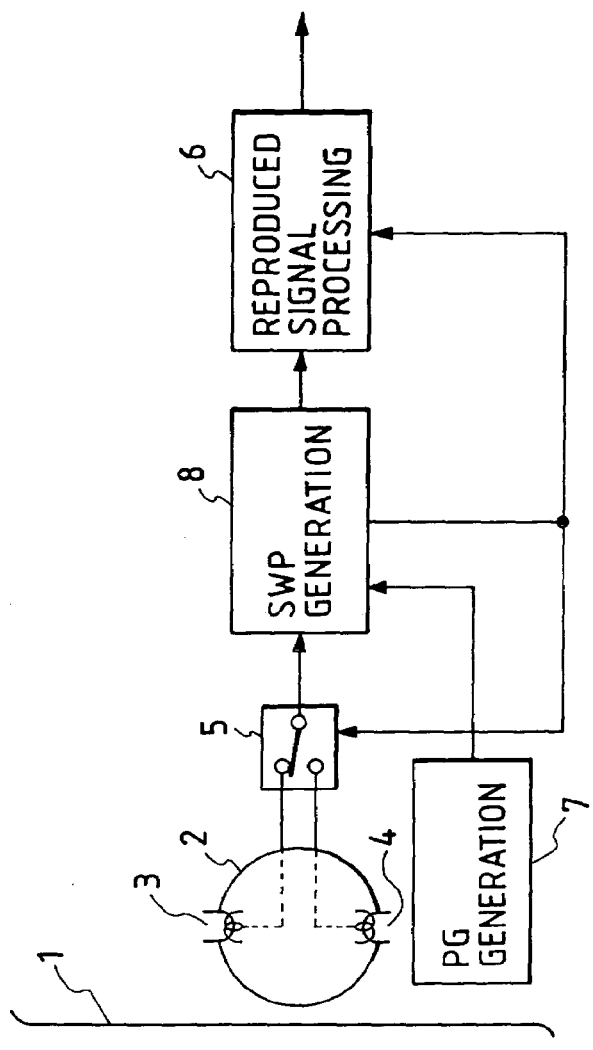
FIG. 1 is a block diagram showing the arrangement of a digital VTR according to an embodiment of the present invention.

In this embodiment, the present invention is applied to a digital VTR. FIG. 1 is a block diagram showing the arrangement of a reproducing system of the digital VTR.

Referring to FIG. 1, digital signals reproduced from a magnetic tape 1 by magnetic heads 3 and 4 are selectively output to a switch pulse (SWP) generation circuit 8 via a switch 5, and the digital signal is then output to a reproduced signal processing circuit 6. The information amount of a reproduced digital signal is compressed using techniques such as DCT, quantization, and the like upon recording. Thus, the reproduced signal processing circuit 6 expands the information amount by performing processing opposite to that upon recording for the reproduced digital signal to convert the digital signal into an image signal with an original format, and outputs the image signal.

A PG generation circuit 7 generates a PG signal in synchronism with the rotation of a cylinder 2 on which the heads 3 and 4 are arranged, and outputs the PG signal to the SWP generation circuit 8. The SWP generation circuit 8 generates an SWP on the basis of the PG signal, as will be described later, and outputs the SWP to the switch 5 and the reproduced signal processing circuit 6. In the reproduced signal processing circuit, the SWP is used for the purpose of, e.g., a start signal of processing such as error correction in units of tracks. The switch 5 is switched in response to the SWP, and alternately outputs the reproduced signals from the heads 3 and 4.

Figure 2:
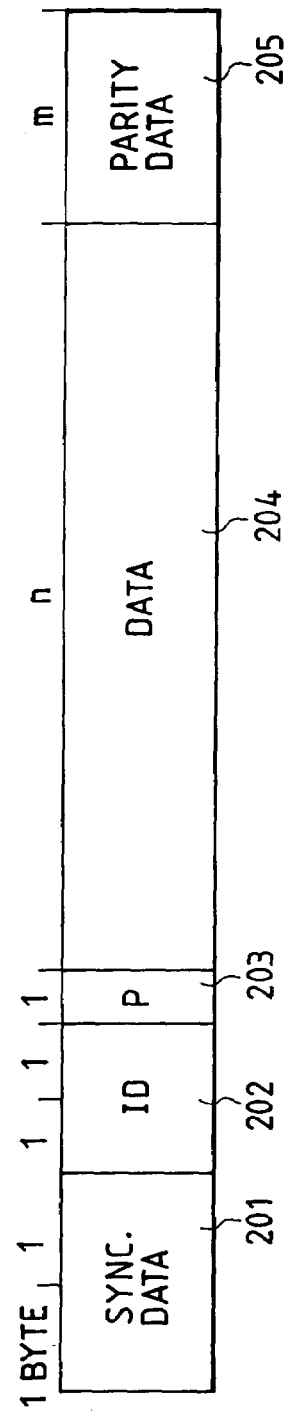
FIG. 2 is a view showing the recording format in the embodiment of the present invention.

The format of data handled in this embodiment will be explained below. FIG. 2 shows the format of data handled in this embodiment.

FIG. 2 shows the format of one sync. block. The sync. block includes sync. data 201 which is located at the beginning of the sync. block and serves as reference data upon detection of data in each block, ID data 202 which indicates the position, on a track, of the sync. block, the attribute of effective data included in the sync. block, and the like, parity data 203 used for error correction/detection of the ID data, effective data 204 consisting of image data, audio data, and the like, and parity data 205 used for error correction of the effective data. In this embodiment, a plurality of such sync. blocks recorded on a single track are reproduced.

The SWP generation circuit 8 will be described below with reference to FIG. 3.

Figure 3:
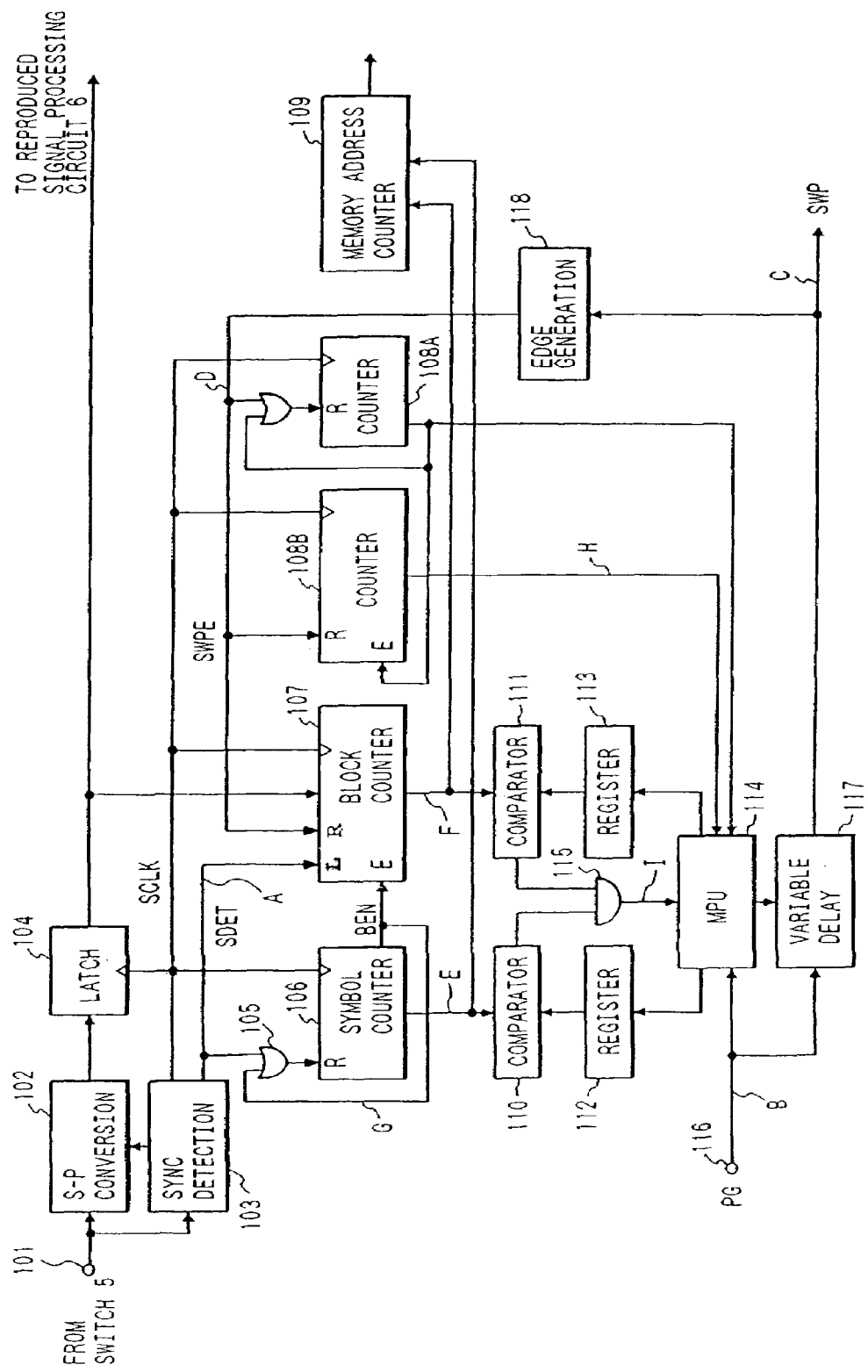
FIG. 3 is a block diagram showing the arrangement of an SWP generation circuit shown in FIG. 1.

FIG. 3 is a block diagram showing the arrangement of the SWP generation circuit. Referring to FIG. 3, a reproduced signal output from the switch 5 is input via a terminal 101, and is supplied to a serial-to-parallel (S-P) conversion circuit 102 and a sync. detection circuit 103.

The S-P conversion circuit 101 converts the serially input reproduced signal into parallel data in units of a predetermined number of data, and outputs the parallel data to a latch circuit 104. The latch circuit 104 outputs the signal output from the S-P conversion circuit 102 in response to clocks SCLK (to be described later).

On the other hand, the sync. detection circuit 103 generates a sync. detection signal SDET by detecting sync. data in the reproduced signal, and also generates clocks SCLK in units of bits of the reproduced signal.

The signal SDET output from the sync. detection circuit 103 is supplied to a symbol counter 106 and a block counter 107.

The symbol counter 106 counts the number of data in one block. The counter 106 is reset in response to the signal SDET, and then performs a count-up operation in response to clocks SCLK. When the count value of the counter 106 has reached a value corresponding to data for one block, the counter 106 generates a block enable signal BEN to the block counter 107. The symbol counter 106 resets itself in response to the signal BEN.

The block counter 107 is reset in response to edge pulses SWPE indicating the leading and trailing edges of the SWP output from an edge generation circuit 118. The block counter 107 performs two different operations depending on whether or not it receives the signal SDET.

When the sync. detection circuit 103 detects sync. data in each sync. block, and outputs a signal SDET, the signal SDET is input to a load input terminal L of the block counter 107. Upon reception of the signal SDET at the input terminal L, the block counter 107 extracts the ID data following the sync. data in each sync. block in reproduced data output from the latch circuit 104 using the clocks SCLK. The ID data of each block includes a block serial number (block number) in one track, and the block number is loaded.

Therefore, the output from the counter 107 is written for each sync. block depending on the contents of the ID data when the counter 107 receives the signal SDET.

A case will be explained below wherein sync. data in the reproduced signal cannot be detected due to, e.g., dropout of the reproduced signal.

In this case, after the block number in the ID data is loaded immediately before the dropout, the signals BEN are counted in synchronism with the clocks SCLK. More specifically, the signal BEN is output when the counter 106 has counted data for one block, and by counting the signals BEN, the block number of currently reproduced data can be confirmed even when ID data is not input.

Counters 108A and 108B are respectively reset in response to the pulses SWPE. The counter 108A counts the clocks SCLK, and outputs a signal BEN' and resets itself when it has counted a value corresponding to data for one block as in the symbol counter 106. The counter 108B counts signals BEN'. The roles of the counters 108A and 108B will be described later.

The outputs from the symbol counter 106 and the block counter 107 are respectively output to comparators 110 and 111, and are compared with the outputs from registers 112 and 113, as will be described later.

The PG signal generated by the PG generation circuit 7 is input from a terminal 116 as a rectangular wave frequency-divided to ½, and is supplied to an MPU (Micro Processing Unit) 114 and a variable delay circuit 117.

Although the PG signal supplied from the terminal 116 is synchronized with the rotation of the cylinder, it cannot be directly used as the SWP since the relationship between the reproduced signal and the head position is not determined. Therefore, in this embodiment, the SWP is generated by delaying the PG signal using the variable delay circuit 117.

The MPU 114 outputs and stores the data position on an appropriate track designated by an operation unit (not shown) as a symbol position S and a block position B in the registers 112 and 113. Note that the symbol position S and the block position B can be arbitrarily set.

The comparators 110 and 111 respectively compare the outputs from the counters 106 and 107 with the outputs from the registers 112 and 113. When comparators 110 and 111 find coincidences between the outputs, they output signals indicating the coincidences to an AND gate 115. The AND gate 115 logically ANDs the outputs from the comparators, and outputs the AND to the MPU 114.

Upon reception of the signal from the AND gate 115, the MPU 114 fetches the count values of the counters 108A and 108B, and sets the delay time of the variable delay circuit 117 using these count values. The output from the variable delay circuit 117 is output as the SWP.

Note that a memory address counter 109 generates and outputs a write address of a memory in the subsequent signal processing circuit using the count values of the symbol counter 106 and the block counter 107.

The detailed operation of the circuit shown in FIG. 3 will be described below with reference to the timing chart shown in FIG. 4.

Assume that the delay time of the variable delay circuit 117 is temporarily set to be a period for two sync. blocks, and is adjusted using an actual reproduced signal. Also, assume that the number of sync. blocks to be recorded in one track is 10 for the sake of simplicity.

Figure 4:
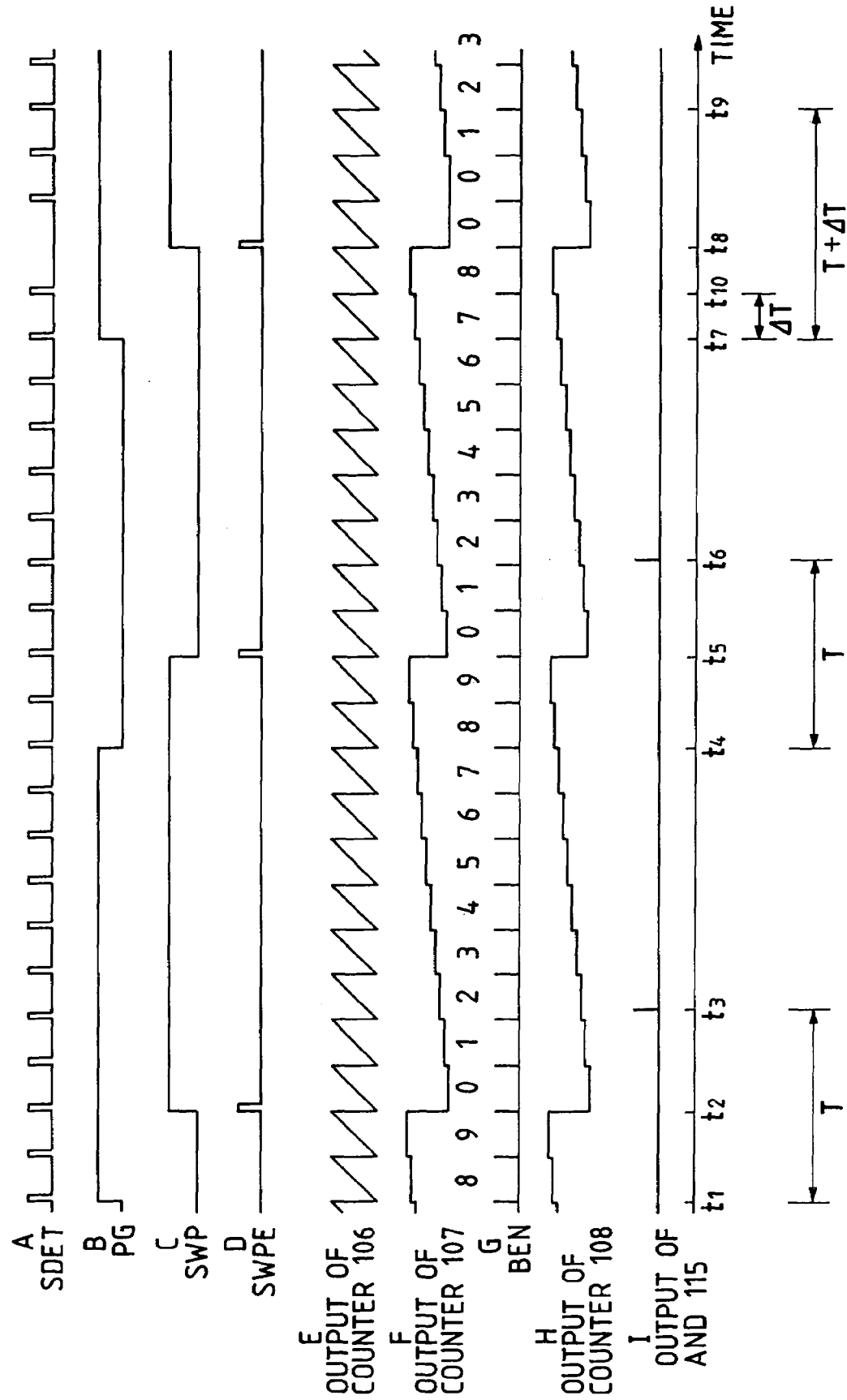
FIG. 4 is a timing chart showing the states of signals in the respective units of the circuit shown in FIG. 3.

A waveform A in FIG. 4 indicates the state of the signal SDET which is free from any dropout. A waveform B indicates the state of the PG signal supplied from the terminal 116. If the PG signal rises at time t1, the SWP indicated by a waveform C rises at time t2 after an elapse of a period for two sync. blocks from the PG signal.

When the SWP rises, the edge generation circuit 118 generates pulses, as indicated by a waveform D, and the block counter 107 and the counters 108A and 108B are reset. Therefore, the counter 107 and the counters 108A and 108B are reset at the generation timings t5 and t8 of the pulses SWPE.

In this embodiment, assuming that "2" is set in the register 112 and "2" is also set in the register 113, the output from the AND gate 115 is as indicated by a waveform I. The MPU 114 fetches the count values of the counters 108A and 108B in response to the signal output from the AND gate 115, and compares the outputs from the counters with the values set in the registers 112 and 113.

In this embodiment, the delay time of the variable delay circuit 117 is set on the basis of the time difference, T, between the output time of the signal from the AND gate 115 and the PG signal.

More specifically, when the output is obtained from the AND gate 115 at time t3, the count values of the counter 106 and the counters 108A and 108B respectively indicate 2 sync. blocks+2 symbols, and these values are equal to those set in the registers 112 and 113. For this reason, the delay time is not changed.

A case will be described below wherein the PG signal is input at a timing earlier by one sync. block than the above-mentioned case, i.e., the PG signal is input at the timing of time t7 earlier by one sync. block than time t10.

As shown in FIG. 4, if the PG signal rises at time t7, a pulse SWPE is generated at time t8, and the counter 107 and the counters 108A and 108B are reset. After the counters are reset, they start counting operations. In this case, since the reproducing heads are switched at an earlier timing than in the above-mentioned case, a reproduced signal for the shortened period cannot be supplied to the terminal 101. Therefore, the state of the counter 107 is as indicated by time t8 of a waveform F in FIG. 4, and a count value "0" continues for a period of two sync. blocks after the counter is reset. For this reason, the output from the AND gate 115 is generated at time t9.

The counter 108A performs substantially the same operation as that of the symbol counter 106, except that it is reset in response to the pulse SWPE. Therefore, the signal BEN' is generated at the same period to have a predetermined phase difference from the signal BEN. In the case of this embodiment, the signals BEN and BEN' have no phase difference therebetween. Since the counter 108B counts the signals BEN' output from the counter 108A after it is reset, it continues the counting operation after it is reset at time t8, as indicated by a waveform H in FIG. 4. Therefore, when the output from the AND gate 115 is supplied to the MPU 114, the counter 108B outputs a count value indicating block 3, and the counter 108A outputs a count value indicating data 2.

The MPU 114 sets the delay time of the variable delay circuit 117 on the basis of the comparison results of the count values of the counters 108A and 108B fetched at time t9 and the values set in the registers 112 and 113. More specifically, in this case, the combination of the count values of the counters 108A and 108B upon reception of the signal from the AND gate 115 indicates 3 blocks+2 symbols, and this value is delayed by one sync. block from the combination of the values set in the registers 112 and 113. Therefore, the delay time can be prolonged by a period for one sync. block, i.e., ΔT as compared to the above-mentioned case.

As described above, in this embodiment, the position of currently reproduced data is confirmed on the basis of sync. data and ID data in the reproduced signal, and the delay time of the SWP with respect to the PG signal is determined with reference to predetermined data in the reproduced data, thus automatically attaining phase control of the SWP with high precision.

Therefore, a normal user can perform the phase control of the SWP in correspondence with apparatuses and tapes using a normally recorded tape without help of a specialist, thus always obtaining a high-quality reproduced signal.

In addition, the deviation amount of the phase of the SWP with respect to the PG signal can be detected by a simple arrangement, i.e., by comparing a value indicating a reference sync. block (symbol) with the count value of the counter upon actual detection of the sync. block (symbol) after generation of the SWP.

Figure 5:
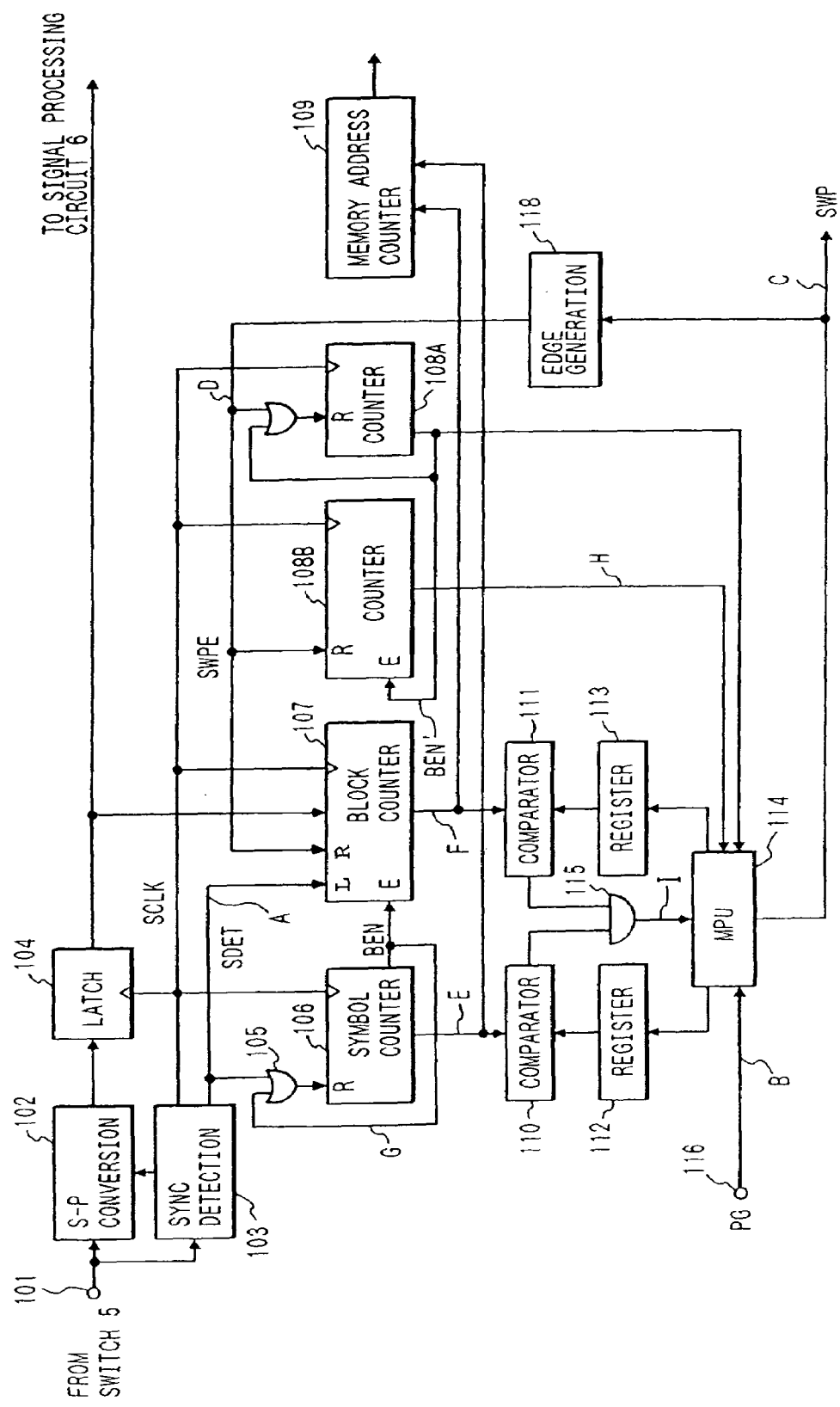
FIG. 5 is a block diagram showing another arrangement of the SWP generation circuit shown in FIG. 1.

In the above embodiment, the SWP is generated by controlling the delay time of the variable delay circuit 117 by the MPU 114. Alternatively, the MPU itself may generate the SWP by delaying the PG signal on the basis of the outputs from the AND gate 115 and the counters 108A and 108B. FIG. 5 shows the arrangement in this case.

According to the arrangement shown in FIG. 5, since the variable delay circuit can be omitted, the circuit scale can be reduced.

In the above embodiment, the counters 108A and 108B are arranged, and their count values are fetched in response to the output from the AND gate 115. Alternatively, an internal counter of the MPU may be used to perform the counting operation.

Furthermore, in the above embodiment, appropriate symbol and block positions are stored in the registers, and are compared with the count values of the symbol and block counters, thereby setting the delay time. Alternatively, only an appropriate block position may be stored in the register, and the delay time may be set in correspondence with the comparison result with the count value of the block counter.

In this case, although the control becomes rougher than the case wherein the symbol position is also set, the register for storing the symbol position and the comparator can be omitted, and the circuit scale can be further reduced.

In the above embodiment, the phase difference between the PG signal and the SWP is detected by utilizing the count values of the counters 108A and 108B at the output timing of the signal from the AND gate 115. Alternatively, a counter which is reset in response to the edge of the PG signal and counts clocks SCLK may be arranged, and the count value of this counter may be fetched in response to the output from the AND gate 115, thereby directly detecting the delay time T.

As can be seen from the above description, since a signal indicating the reproducing start timing of a plurality of heads is generated upon detection of a predetermined reference signal in input digital data, a reference signal can be generated with high precision by a very simple arrangement.

Since the number of blocks in a reproduced signal is counted, and a reference signal indicating the reproducing start timing is generated upon reproduction of a predetermined block, a reference signal can also be generated with high precision, and deterioration of quality of the reproduced signal can be prevented.

What is claimed is:

1. A digital data reproducing apparatus comprising:
    reproducing means for reproducing digital data from a recording medium by using a rotary head, the digital data having a plurality of sync blocks each comprising sync data and ID data indicating a block number of each of the sync blocks;
    detection means for detecting a rotation phase of said rotary head and obtaining a phase-detection signal synchronized with the rotation phase of the rotary head; and
    generating means for detecting predetermined data of a predetermined bit position in a predetermined sync block of a predetermined block number in the reproduced digital data by counting bits in each of the sync blocks and generating a reference signal for determining a start timing of reproduction of the digital data by said rotary head using the phase-detection signal, in accordance with a detection timing of the predetermined data in the predetermined sync block.

2. A digital data reproducing apparatus comprising:
    reproducing means for reproducing digital data from a recording medium by using a rotary head, the digital data having a plurality of sync blocks each comprising sync data and ID data indicating a block number of each of the sync blocks;
    detection means for detecting a rotation phase of said rotary head and obtaining a phase-detection signal synchronized with the rotation phase of the rotary head; and
    generating means for detecting a predetermined sync block of a predetermined block number in the reproduced digital data by comparing the block number indicated by the ID data of each of the sync blocks with the predetermined block number and generating a reference signal for determining a start timing of reproduction of the digital data by said rotary head using the phase-detection signal, in accordance with a detection timing of the predetermined sync block.

* * * * *